US005945786A

United States Patent [19]

Jurek

[11] Patent Number: 5,945,786

[45] Date of Patent: Aug. 31, 1999

[54] DISCHARGE LAMP IGNITER WITH REDUCED NOISE OUTPUT

[75] Inventor: Brian E. Jurek, Austin, Tex.

[73] Assignee: High End Systems, Inc.

[21] Appl. No.: 08/867,542

[22] Filed: Jun. 2, 1997

[51] Int. Cl.$^{6}$ .......... H02H 7/04

[52] U.S. Cl. .......... 315/276; 315/287; 315/219; 315/209 R; 315/274; 361/35

[58] Field of Search .......... 315/DIG. 5, 70, 315/73, 74, 75, 125, 307, 262, 287, 219, 209 R, 276, 278; 361/35, 38

[56] References Cited

U.S. PATENT DOCUMENTS

| | | | |
|---|---|---|---|
| 2,491,961 | 12/1949 | Eigenberger | 315/276 |
| 2,916,671 | 12/1959 | Retzer | 315/276 |
| 4,328,446 | 5/1982 | Fallier, Jr. et al. | 315/47 |
| 4,342,948 | 8/1982 | Samuels | 315/290 |
| 4,403,173 | 9/1983 | Mayer | 315/289 |
| 4,521,822 | 6/1985 | Simard | 315/74 |
| 5,424,611 | 6/1995 | Moriarty, Jr. | 315/94 |

*Primary Examiner*—Don Wong
*Assistant Examiner*—Wilson Lee
*Attorney, Agent, or Firm*—Kevin L. Daffer; Conley, Rose & Tayon

[57] ABSTRACT

A gas discharge lamp is provided having a ballast control element and suppressible igniter. The igniter is chosen to superimpose an ignition pulse onto the initial AC ballast cycle or cycles provided to the lamp. The secondary coil of the igniter transformer is initially shorted until sufficient voltage is applied to the igniter. This causes a switch arranged across the secondary coil to open. A voltage detector coupled to a primary winding of the igniter transformer senses the amount of voltage applied from the ballast. Once that amount has been detected, the secondary winding is no longer shorted and the igniter can initially ignite the lamp during a peak of the initial cycle or cycles from the ballast. After the lamp has been initially ionized/discharged, or after a pre-defined set of discharges, the switch remains closed for the duration of each and every ballast cycle. Thus, the igniter is suppressed from the ballast output, and the ballast alone provides lamp discharge.

23 Claims, 3 Drawing Sheets

DISCHARGE LAMP IGNITER WITH REDUCED NOISE OUTPUT

BACKGROUND OF THE INVENTION

1. Field of the Invention

This invention relates to a discharge lamp and, more particularly, to an igniter circuit which minimizes or substantially eliminates magnetostrictive-generated audio frequencies within the igniter during operation of the discharge lamp.

2. Description of the Related Art

The structure and operation of a discharge lamp, henceforth referred to as a "lamp" is generally well known. A lamp typically comprises a quartz tube filled with gas. The gas ambient is exposed to a pair of electrodes. During times when current is passed between the electrode pair, the gas is excited to a plasma state which causes photon emissions. Plasma excitation causes high intensity light emission from the lamp.

Lamps of this type are regulated by a ballast. Among other functions, a ballast provides current regulation across the electrode pair under conditions of changing voltage. Generally speaking, there are two types of ballast: an electronic ballast or a core-coil ballast. Regardless of its form, most ballast operably limit current to the lamp. Output from the ballast can be modeled as a regulated current source. Absent a ballast, rapid increases in voltage across the electrode pair can result in malfunction or damage of the lamp. The ballast can be a part of or separate from the AC power supply.

Lamps of this type generally utilize an igniter in conjunction with the ballast. The igniter essentially provides high voltage, short duration pulses which assist in initiating lamp ionization or discharge. Thus, while the ballast converts the AC line voltage to the proper amplitude and impedance level, an igniter superimposes a voltage pulse on the ballast output. The igniter pulse ignites the lamp and, after ignition, the voltage across the lamp settles back to a steady state value lower than the ignition pulse value. An igniter typically comprises various circuits components arranged in series between the ballast and the lamp. Most igniters include a step-up transformer. The AC ballast output is operably forwarded to one terminal of the primary and secondary windings of that transformer. When the transformer produces a voltage spike across the electrode pair, lamp break-over (or ionization occurs). During initial ionization, current across the primary and secondary windings, and between the anode-cathode rapidly rises.

Most transformer windings encircle tubular bobbins (either split or singular bobbins). Most bobbins are then enclosed within a ferromagnetic core made of, e.g., iron, steel or nickel. The core can be formed from a series of laminations which are clamped to form a rigid assembly of, for example, nickel iron suspended in ceramic (ferrite). As current rapidly increases and decreases (i.e., transitions) through the primary and secondary windings, electromagnetic ("EM") field of substantial magnitude transitions around the core and expands/contracts synchronous with twice the AC input frequency. A problem associated with rapid current and EM fluctuations within a transformer is the mechanical stress placed on the bobbins relative to the core. Under conditions of quickly saturating current and then quickly removing the current, expansion/contraction on the mechanical components causes a phenomenon known as "magnitostriction" and/or "electrostrictions". Magnitostriction is the characteristic of mechanical components and materials of those components which cause them to expand or contract under the influence of a magnetic field. Electrostriction is the same characteristic as magnitostriction, however, under the influence of an electric field.

If the transformer components and materials are subjected to a sufficiently strong EM field, generally at a frequency less than 20 KHz, the transformer will produce an audible noise output discernible to the user as a vibration or hum. The vibration generally coincides with the AC power supply peaks, or roughly twice the AC input frequency attributed from the igniter. Unfortunately, the commutation frequency through the transformer occur near the center of the audio spectrum which tends to exacerbate noise received on audio equipment placed proximate to the lamp control circuitry. This vibration at approximately twice the AC frequency interferes with high fidelity sound equipment placed near or within the same room as the lamp circuitry. An improvement in conventional ballast and/or igniter design for certain lamp applications is therefore needed.

SUMMARY OF THE INVENTION

The problems outlined above are in large part solved by an improved lamp discharge system incorporating an igniter. In particular, the improved system involves, in part, removing current and voltage from the transformer of the igniter after sufficient time has been allotted to warming the lamp. Once the lamp has been ionized, subsequent discharge can be achieved solely by the ballast—without need for the superimposed igniter pulse. Thus, once the lamp has been, so called "started" and the lamp is sufficiently warm, further starter (or igniter pulses) are suppressed.

The present system allows use of an igniter pulse to start a cold lamp and thereafter suppress unnecessary igniter pulses after the lamp has undergone several discharge cycles (i.e., is warmed). Once warmed, the igniter pulse is no longer needed for attaining lamp discharge, and the present system essentially removes the igniter (i.e., igniter pulse) from the ballast output. Removing the igniter pulse involves closing a switch across the igniter secondary. Prior to eliminating the igniter altogether, the system selectively employs the switch. Specifically, the igniter transformer secondary is shorted at selected times. The switch closes after a time duration has elapsed subsequent to initial ionization and for a time duration prior to the beginning of ionization. Removing current from the igniter transformer coil at select times prior to the lamp being warmed and entirely after the lamp is warmed allows the transformer to maintain a state which is less susceptible to constriction (i.e., magnitostriction and/or electrostriction). Removing current which causes constriction removes the EM emissions associated with passing AC through the igniter transformer.

It is important to detect voltage and selectively open the switch during initial, cold discharge/ionization. A system is utilized which can perform this function, the system employs an improved igniter and/or ballast circuit which detects voltage and, responsive to that voltage, operates a relay. Ballast output and/or power supply voltages are detected by the voltage detection circuit. The detection circuit responds by engaging the relay when the sensed voltage exceeds a pre-defined amount. Once the relay engages, a normally closed switch opens to place the secondary windings of the igniter transformer in series between the ballast and the lamp. The sensed voltage is proportional, and indicative of, the voltage across the electrode pair sufficient for ionization. According to one embodiment, the relay engages, and the switch opens prior to ionization voltage magnitude. Voltage will accumulate across the electrodes, which ultimately causes a voltage spike to appear across the electrodes. Given sufficient voltage accumulation and upward transient magnitude, the voltage will eventually break over the electrodes, causing the lamp voltage to drop to a relatively low value as sensed by the voltage detector. The voltage detector then disengages the relay, allowing the switch to transition back to its normally closed position. Once closed, the secondary coil of the igniter transformer is shorted to form a current path which bypasses the transformer. The current path forms a direct conduit between the ballast output and the lamp.

At least one purpose behind shorting the secondary coil is to eliminate voltage and current across the transformer coil attributable to constriction. More importantly, limiting constriction achieves minimal component and material vibration within the igniter transformer.

The present invention contemplates an igniter circuit and/or method for reducing EM emission from the igniter circuit. The method includes providing a voltage detector and a discharge lamp operatively coupled to the ignitor. A periodic power supply of cyclical voltage is applied upon the voltage detector. A switch arranged across the secondary transformer coil is opened at times when the voltage exceeds a predetermined amount. The switch remains open for a time duration needed to begin ionization of the discharge lamp. Thereafter, the switch is closed and maintained closed for a predetermined time duration after ionization. Once a few cycles of the cyclical voltage has expired and the lamp has previously achieved discharge, the switch is maintained closed even during ionization achieved solely by the ballast.

BRIEF DESCRIPTION OF THE DRAWINGS

Other objects and advantages of the invention will become apparent upon reading the following detailed description and upon reference to the accompanying drawings in which.

Figure 1:
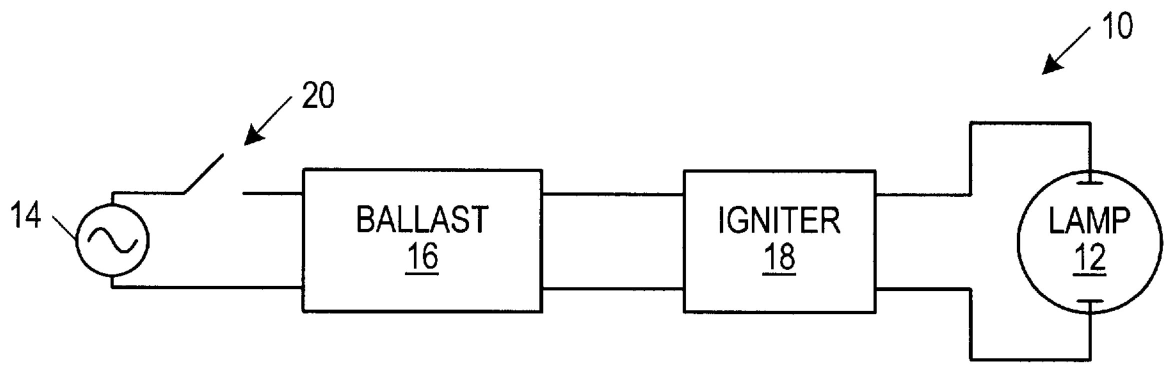
FIG. 1 is a block diagram of a system used to operate a lamp from an AC power source.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the drawings, FIG. 1 illustrates a system 10 used to operate a lamp 12 from an AC power source 14. Lamp 12 is preferably a high pressure gas discharge lamp requiring an igniter pulse superimposed on a regulated (or converted) output from AC source 14. As will be discussed below, the superimposed igniter pulse is terminated (or suppressed) after the initial AC cycle or the initial AC cycle and a few (e.g., one to three) cycles immediately thereafter. The regulated output may be provided from ballast 16, and the superimposed igniter pulse may be provided from igniter 18.

Upon closure of an on/off switch 20, output from AC source 16 is provided at periodic intervals to ballast 16. Ballast 16 receives AC power from source 16, for example, at 115 volts and at 50 or 60 Hz.

Depending on the configuration of ballast 16, and the requirements of lamp 12, output from ballast 16 generates an AC output of typically greater voltage than that from AC source 14. For example, voltage can increase from 115 volts peak-to-peak to between 200 and 220 volts peak-to-peak. Igniter 18 receives ballast 16 output and produces high amplitude, short duration pulses which assist in initiating ionization during times when the lamp is cold (i.e., prior to initial ionization and/or discharge). The igniter pulses appearing at the output of igniter 18 are typically 2500 to 10,000 volts in amplitude and at least one microsecond in duration. The igniter pulses occur in timed relation to the AC power, typically synchronized with initial peaks of the AC voltage.

Initiation of lamp discharge, or ionization, can be described with reference to FIGS. 1 and 2, assuming AC power pre-exists prior to closing switch 20. The pre-existing power will be regulated and superimposed with an igniter pulse 24 to "start" the lamp. Igniter pulse 24 appears across the anode-cathode pair of lamp 12 for a brief moment in time beginning at the time of ionization $t_1$. The lamp voltage remains relatively low prior to $t_1$. Igniter 18 inductively generates igniter pulse 24 during the initial cycle and possibly a couple of cycles subsequent to the initial cycle once for each half cycle, as shown in FIG. 3.

Figure 2:
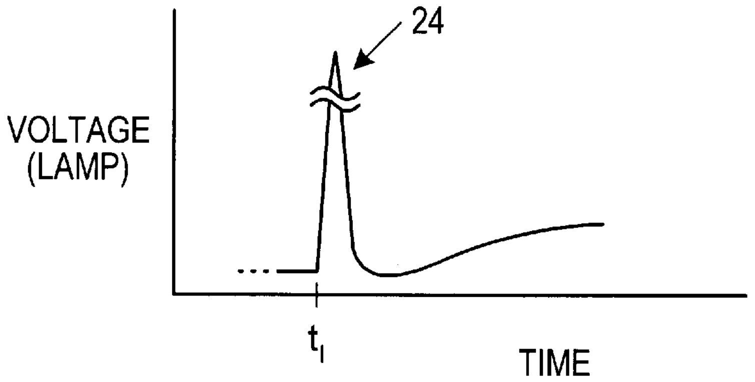
FIG. 2 is a timing diagram of voltage across electrodes of the lamp at a time immediately prior to and subsequent to lamp ionization within a half cycle of the AC power source frequency.
Figure 3:
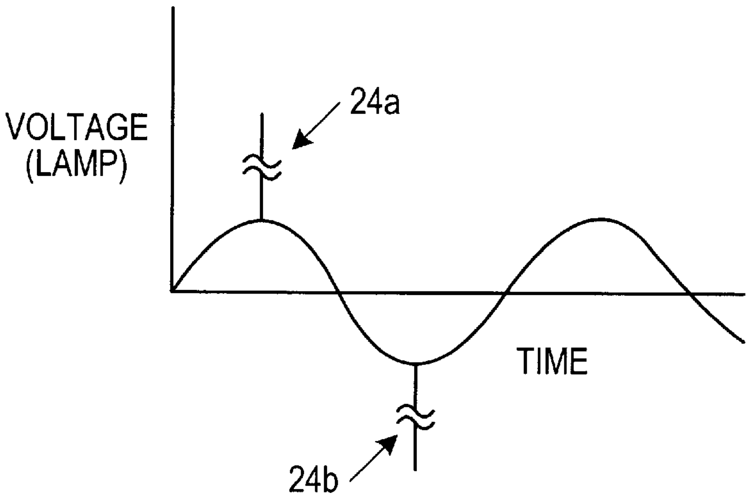
FIG. 3 is a timing diagram of ignition voltage pulses superimposed on a ballast periodic output as forwarded to the lamp during an initial cycle of the AC power source frequency.

FIG. 3 more specifically illustrates ignition pulses 24 necessary to initially ionize lamp 12. Application of the ignition pulses 24 preferably occur during each half cycle. Referring to FIGS. 2 and 3 in combination, it is recognized that a single ignition pulse is superimposed on at least the initial AC peak voltage. Thereafter, the lamp has been discharged (i.e., warmed) and the ignition pulse is no longer needed. This is evident from the higher voltage appearing across the electrodes subsequent to initial ionization (see, e.g., FIG. 2).

Figure 4:
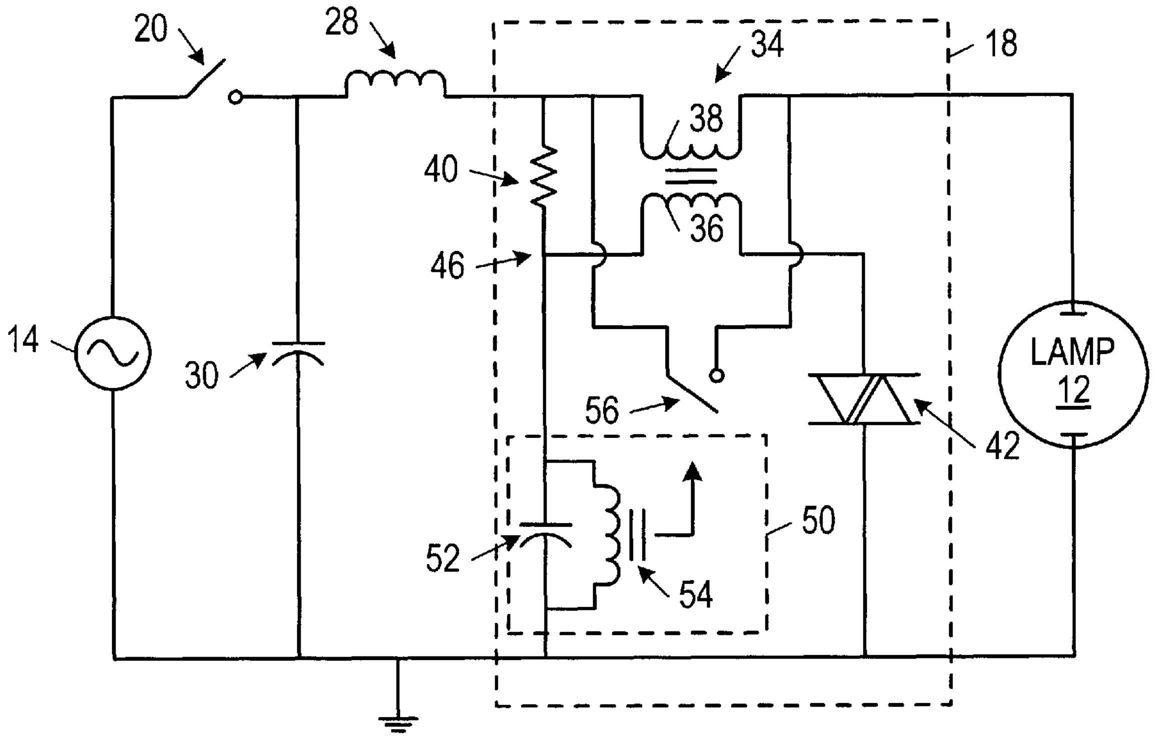
FIG. 4 is a circuit diagram of the system of FIG. 1, wherein an igniter circuit within the system comprises a mechanism for detecting voltage output from a ballast within the system and for shorting a transformer within the igniter circuit to minimize constriction and current saturation within the transformer coil.

FIG. 4 depicts, in more detail, system 10 according to one embodiment of the present invention. Specifically, ballast 16 can be modeled as an inductor 28 and a power factor correction capacitor 30. The magnitude of capacitor 30 and inductor 28 can vary depending on whatever might be the desired current regulated output from the ballast.

Placed between inductor 28 and lamp 12 is an igniter 18 comprising improvements herein below described. Igniter 18 preferably comprises a converter circuit which can superimpose an instantaneous high voltage on top of the ballast voltage. The converter circuit may include a step up transformer 34 having primary winding 36 and secondary winding 38. The number of turns of secondary winding 38 is preferably greater than the number of turns on primary winding 36, each of which may share a singular bobbin or are arranged on separate bobbins.

According to one design, primary windings 36 are arranged between a current limiting resistor 40 and a diac 42. Diac 42 is further coupled between primary windings 36 and ground. Diac 42 is typically a semiconductor bidirectional breakover device. It may also be a spark gap or any other device that exhibits a rapid negative resistance region in its voltage current relation. When voltage on a first terminal of diac 42 exceeds voltage on the opposed, second terminal by a threshold amount, then current can flow from the first terminal to the second terminal. Conversely, when voltage on the second terminal exceeds voltage on the first terminal, then current can flow from the second terminal to the first terminal.

The function of transformer 34 may arise only if switch 20 is closed. Once closed, current and voltage is applied to the ballast and, more specifically, to the inductive and capacitive loads 28 and 30. Application of power results in accumulation of voltage at node 46. That voltage serves two functions. First, sufficient accumulation of voltage will forward bias diac 42. The drop in voltage across the diac during breakover is placed across the primary of the step up transformer, which is subsequently coupled to the secondary which scales it by the turns ratio. This momentary voltage is of sufficient magnitude and duration to ionize the lamp. Second, accumulation of voltage at node 46 can be detected by a voltage detector 50.

Given sufficient sensed voltage across capacitor 52, relay 54 engages. Once engaged, relay 54 opens the terminals 56, causing termination of a short across secondary windings 38. Accordingly, relay 54, in combination with the spaced terminals 56, operates as a remotely controlled electrical switch. Relay 54 can therefore be modeled as an EM-generating coil, and terminals 56 are merely contacts responsive to the EM generated by the coil. The output rating, number of poles, composition of contact terminals, packaging style and form factor can vary depending on the most suitable methodology in which to selectively short and open terminals across secondary winding 38. The basic operation of a relay having variable characteristics of the immediately aforesaid classifications is that it contain a coil which, when energized, attracts an armature against the tension of a return spring. This causes the normally closed contact to break (i.e., open). When the electromagnet is de-energized during times when the voltage across capacitor 52 is less than a pre-defined amount, then the return spring pulls the armature open and the normally closed contacts are closed.

The operation and benefit of igniter 18 having voltage detection 50 and having means for selectively shorting secondary warnings 38 is described in reference to FIGS. 5–8.

Figure 5:
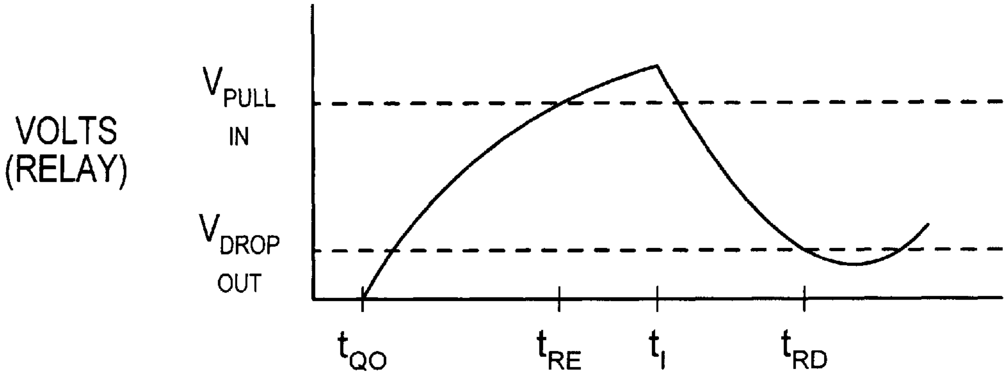
FIG. 5 is a timing diagram of voltage across terminals of a relay used to short the transformer a select times during initial discharge of the lamp and to permanently short the transformer after initial discharge occurs.

FIG. 5 illustrates voltage across relay 54 as a function of time. Description of the time diagram of FIG. 5 is best explained in conjunction with FIG. 4. Voltage across relay 54 increases subsequent to closing switch 20 at time $t_{QO}$. Voltage is supplied from voltage source 14 which increases in absolute magnitude beyond a voltage needed to energize relay 54 (i.e., beyond the the $V_{PULL\ IN}$ amount). The time at which voltage exceeds $V_{PULL\ IN}$ is depicted as $t_{RE}$. At time $t_{RE}$, the relay is energized and switch 56 opens. Switch 56 remains open for a time sufficient to accumulate break over voltage across the anode-cathode pair. Break over emanates as ionization at time $t_1$. Thereafter, voltage decreases (refer to FIG. 2) rather quickly across the lamp which translates to a decrease across capacitor 52 and relay 54. Decrease continues past $V_{DROP\ OUT}$. AT $V_{DROP\ OUT}$, the switch closes and remains closed until the voltage again exceeds $V_{PULL\ IN}$. Voltage in most instances will not thereafter exceed $V_{PULL\ IN}$ since the relay voltage will typically remain, subsequent to $T_{RD}$, between $V_{DROP\ OUT}$ and $V_{PULL\ IN}$. Subsequent voltage decrease is limited by the power supplied from AC source 14, and subsequent voltage increase is limited by the resistor-inductor component of the relay.

Switch 56 is open only for a limited time immediately prior to and immediately after ionization at least the initial ionization/discharge. At all other times during each and every half cycle of the AC cycle, switch 56 remains closed and secondary winding 38 is shorted.

Figures 6, 7, 8:
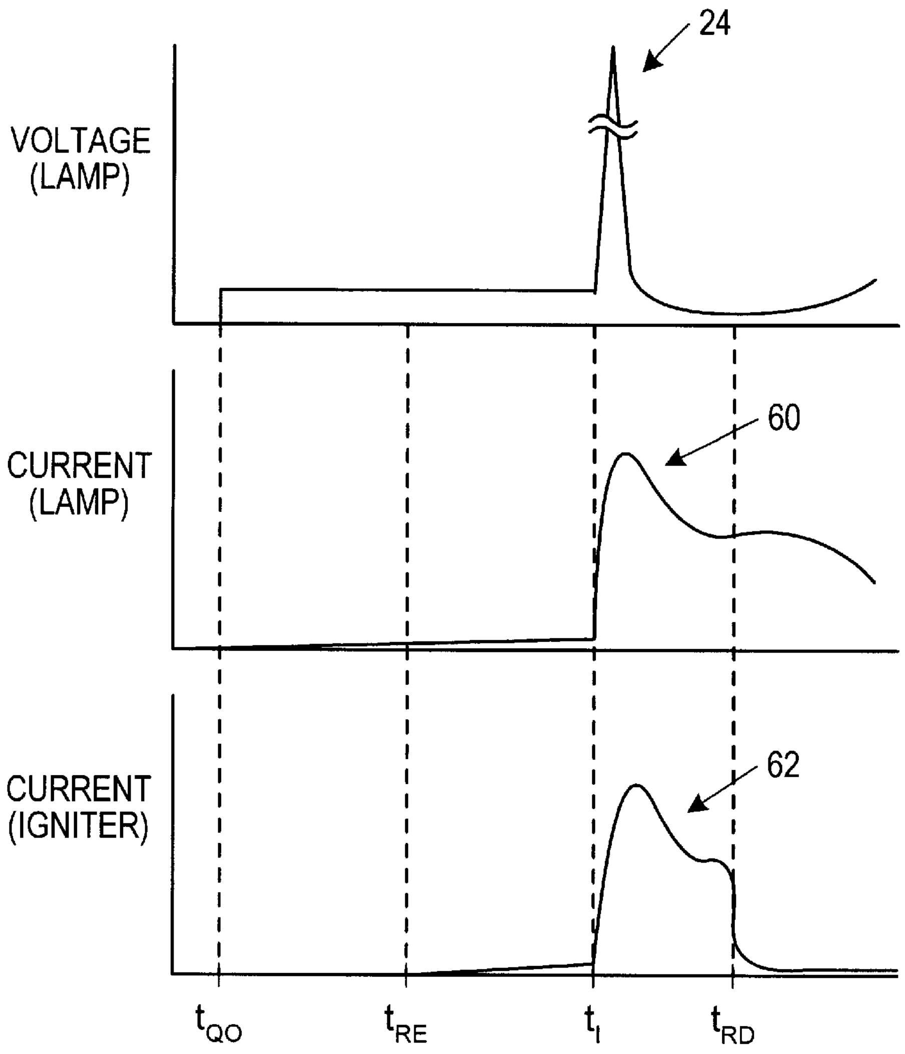
FIG. 6 is a timing diagram of voltage across electrodes of the discharge lamp after activation of an on/off switch, engagement of the relay, ionization of the lamp, and disengagement of the relay during a cycle needed to initially discharge the lamp.
FIG. 7 is a timing diagram of current across electrodes of the discharge lamp after activation of an on/off switch, engagement of the relay, ionization of the lamp, and disengagement of the relay during a cycle needed to initially discharge the lamp.
FIG. 8 is a timing diagram of current across either the primary or secondary coils of the transformer after activation of an on/off switch, engagement of the relay, ionization of the lamp, and disengagement of the relay during a cycle needed to initially discharge the lamp.

FIGS. 6–8, like FIG. 5 illustrate current/voltage conditions during the initial ionization of the discharge lamp. After initial discharge, or a relatively few initial discharges, the switch remains closed and current through the igniter transformer is substantially zero, contrary to the initial ionization condition of the igniter shown in FIG. 8. FIG. 6 illustrates in further detail the timeline of FIG. 2 not only after the initial ionization, but also before the initial ionization and after closure of switch 20 (shown in FIG. 4). Referring to FIGS. 4 and 6 in conjunction, when switch 20 closes at $t_{QO}$, a relatively small voltage is applied to lamp 12. That voltage can be, for example, 10 volts. The voltage remains after switch 56 is opened at time $t_{RE}$. It is not until there is sufficient accumulation of charge that lamp 12 breaks over, or initially ionizes/discharges, at time $t_1$. The ignition pulse 24 can be, for example, between 2500 to 10,000 volts for a relatively short duration of, for example, at least one microsecond.

Referring to FIGS. 2 and 7, current across lamp 12 appears similar to voltage only in that current is fairly small until ionization. During ionization, current increases rapidly as ionization current 60. Depending on the wattage needed to ionize a particular gas species, ionization current during initial ionization/discharge can vary in proportion to the voltage of ignition pulse 24.

FIGS. 2 and 8 illustrate voltage across igniter 18 and, more specifically, current through the secondary windings 38 of transformer 34. At time $t_{QO}$, current in winding 38 is diverted through the closed switch 56. It is not until switch 54 opens at time $t_{RE}$ that current flows through secondary windings 38. The current is relatively small until break over occurs across the electrode pair and/or across diac 42. Break over inductively couples a voltage pulse across the secondary windings, that pulse depicted as reference numeral 24. FIG. 8 thereby illustrates shorting of the secondary windings between time $t_{QO}$ and time $t_{RE}$, and also after time $t_{RD}$ for each half cycle of the periodic AC input supply 14. Shorting continues after the initial ionization pulse or pulses for the entirety of each and every subsequent AC cycle. Shorting the inductive load of the igniter at select times during initial ionization and at all times subsequent to initial ionization thereby minimizes constriction and the hard driving fluctuations within the igniter transformer. Eliminating the saturating current and minimizing inductive loading within the secondary winding by shorting the winding and suppressing unnecessary igniter pulses into a warm, previously discharged lamp helps minimize igniter-induced EM emissions and/or vibration output from the igniter.

In summary, removing the inductance across the secondary winding of an igniter which is operably not needed for continued operation of the lamp eliminates inductive loading and noise emission from the igniter. Thus, current and voltage fluctuations within the transformer coil are eliminated to minimize applied magnitization to the the transformer coil, as demonstrated in reduced constriction and audible vibration. Further, whenever the relay switch is closed, no magnetic flux and/or noise can be emitted from the igniter itself. This, by its nature, minimizes overall power dissipation from the transformer element, allowing for a smaller, more cost effective transformer to be used. Therefore, as a byproduct, the present system is more efficient and better suited to noise sensitive applications.

It will be appreciated to those skilled in art having the benefit of this disclosure that this invention is believed applicable to any lamp discharge ballast requiring a starter or igniter. Furthermore, it is also to be understood that the form of the invention shown and described is to be taken as exemplary, presently preferred embodiments. Various modifications and changes may be made to each and every component within the ballast and/or igniter provided, however, the snubbing effect of shorting the igniter transformer at select times is achieved as set forth in the specification and defined in the below-identified claims. It is therefore intended that the following claims be interpreted to embrace all such modifications and changes and, accordingly, the specification and drawings are to be regarded in an illustrative rather than a restrictive sense.

What is claimed is:

1. An igniter circuit, comprising:

a transformer having primary and secondary coils, said secondary coil is adapted for coupling between a regulated, periodic power supply and a discharge lamp during use; and a switch connected across the terminals of the secondary coil for shorting the secondary coil for a predetermined time duration within a portion of an initial cycle of the periodic power supply, said pre-determined time duration occurring except for a time immediately after ionization of said discharge lamp.

2. The igniter circuit as recited in claim 1, wherein said pre-determined time duration occurs after said time immediately after ionization of said discharge lamp.

3. The igniter circuit as recited in claim 1, wherein the switch is connected for shorting the secondary coil for the duration of each cycle of the periodic power supply only after at least a portion of the initial cycle has terminated.

4. The igniter circuit as recited in claim 1, wherein said periodic power supply comprises an AC power supply.

5. The igniter circuit as recited in claim 1, further comprising:

a voltage detector for sensing voltage magnitude forwarded to the secondary coil from the power supply;

a relay coupled to actuate the switch and for maintaining the shorting of the secondary coil when the sensed voltage is less than a pre-defined amount; and a diac coupled to one terminal of the primary coil, and wherein the relay is coupled to another terminal of the primary coil.

6. The igniter circuit as recited in claim 5, wherein said relay is coupled for terminating the shorting of the secondary coil when the sensed voltage is greater than a pre-defined amount.

7. The igniter circuit as recited in claim 6, wherein said pre-defined amount is proportional to a voltage sufficient to ionize the discharge lamp.

8. The igniter circuit as recited in claim 1, wherein said discharge lamp comprises a gas-filled discharge lamp.

9. The igniter circuit as recited in claim 1, wherein the number of windings within said secondary coil exceed the number of windings within said primary coil.

10. A method for reducing periodic noise emitted from an igniter of a discharge lamp, comprising:

providing a voltage detector and a discharge lamp operably coupled to said igniter comprising primary and secondary transformer coils;

applying a periodic power supply of cyclical voltage upon the voltage detector;

opening a switch arranged across the secondary transformer coil at times when the cyclical voltage during an initial cycle of the cyclical voltage exceeds a predetermined amount;

maintaining the switch open for a time duration wherein said maintaining occurs for the time duration extending prior to ionization of the discharge lamp; and closing the switch after the discharge lamp ionizes.

11. The method as recited in claim 10, wherein said opening comprises sensing the cyclical voltage upon a relay coil and using the sensed voltage to open the switch located proximate the relay coil.

12. The method as recited in claim 10, wherein said opening occurs when a relay coil arranged proximate to the switch is energized.

13. The method as recited in claim 10, wherein said closing occurs when a relay coil arranged proximate to the switch is de-energized.

14. An igniter circuit, comprising:

a transformer having primary and secondary coils, the secondary coil is adapted for coupling between a regulated, periodic power supply and a discharge lamp during use;

a switch connected across the terminals of the secondary coil for shorting the secondary coil except for during a pre-determined time duration within a portion of an initial cycle of the periodic power supply, the predetermined time duration occurring from a time prior to the application of a high amplitude voltage onto the power supply to a time after the application of the high amplitude voltage onto the power supply.

15. The igniter circuit as recited in claim 14, wherein the switch is connected for shorting the secondary coil except for during a second pre-determined time duration within a second portion of an initial cycle of the periodic power supply, the second pre-determined time duration occurring from a time prior to the application of the high amplitude voltage to a time after the application of the high amplitude voltage.

16. The igniter circuit as recited in claim 14, further comprising:

a voltage detector for sensing voltage magnitude forwarded to the secondary coil from the power supply;

a relay coupled to actuate the switch, the relay for opening the switch when the sensed voltage is greater than a pre-defined amount, the relay for closing the switch when the sensed voltage is less than a pre-defined amount.

17. The igniter circuit as recited in claim 16, wherein the relay is coupled for maintaining the shorting of the secondary coil when the sensed voltage is less than a pre-defined amount.

18. The igniter circuit as recited in claim 16, wherein the relay opens the switch when the sensed voltage is greater than a first pre-defined amount, the relay closes the switch when the sensed voltage less than a second pre-defined amount, the first pre-defined amount is greater than the second pre-defined amount.

19. The igniter circuit as recited in claim 18, wherein the relay is coupled for maintaining the shorting of the secondary coil when the sensed voltage is less than a first pre-defined amount.

20. The igniter circuit as recited in claim 14, further comprising:

a voltage detector coupled to one terminal of the primary coil for regulating the application of the high amplitude voltage onto the regulated, periodic power supply for the discharge lamp.

21. The igniter circuit as recited in claim 20, wherein the voltage detector comprises a semiconductor bi-directional breakover device.

22. An igniter circuit, comprising:

a transformer having primary and secondary coils, the secondary coil is adapted for coupling between a regulated, periodic power supply and a discharge lamp during use;

a voltage regulator coupled to one terminal of the primary coil for regulating the application of a high amplitude voltage onto the regulated, periodic power supply for the discharge lamp; and a voltage detector coupled to another terminal of the primary coil for regulating a switch connected across the terminals of the secondary coil for shorting the secondary coil except for when the detected voltage is greater than a pre-defined amount.

23. The igniter circuit as recited in claim 22, wherein the pre-defined amount for opening the switch connected across the terminals of the secondary coil is less than a second pre-defined amount for actuating the voltage regulator for applying the high amplitude voltage onto the power supply.

* * * * *